United States Patent [19]

Outmans

[11] 4,201,060

[45] May 6, 1980

[54] GEOTHERMAL POWER PLANT

[75] Inventor: Harry D. Outmans, Laguna Beach, Calif.

[73] Assignee: Union Oil Company of California, Brea, Calif.

[21] Appl. No.: 936,609

[22] Filed: Aug. 24, 1978

[51] Int. Cl.² ............................................. F03G 7/00
[52] U.S. Cl. ........................................ 60/641; 165/45
[58] Field of Search ............................ 60/641; 165/45

[56] References Cited

U.S. PATENT DOCUMENTS

| | | | |
|---|---|---|---|
| 3,274,769 | 9/1966 | Reynolds | 60/641 |
| 3,470,943 | 10/1969 | Van Huisen | 60/641 |
| 3,786,858 | 1/1974 | Potter et al. | 165/45 |
| 3,817,038 | 6/1974 | Paull et al. | 60/641 |
| 3,857,244 | 12/1974 | Faucette | 60/641 |
| 3,975,912 | 8/1976 | Greene | 60/641 |
| 4,060,988 | 12/1977 | Arnold | 60/641 |
| 4,079,590 | 3/1978 | Sheinbaum | 60/641 |

OTHER PUBLICATIONS

O'Keefe, W., "Geothermal Power: Sleeping Giant Stirs," *Power*, Apr. 1973, pp. 32–34.
"Hot Dry Rock Geothermal Energy: Status of Exploration and Assessment," ERDA 77-74, Jun. 1977, pp. 1, 2, 6, 148 & 149.

*Primary Examiner*—Allen M. Ostrager
*Attorney, Agent, or Firm*—Dean Sandford; Daniel R. Farrell

[57] ABSTRACT

A method for generating electricity wherein a geothermal fluid is produced from a moderate temperature hydrothermal formation and is used to supply sufficient sensible heat to preheat a working fluid, thereby cooling the geothermal fluid. The cool geothermal fluid is preferably reinjected into the hydrothermal formation and the preheated working fluid is injected into a dry hot rock formation wherein it is vaporized. The hot vapor is then recovered and utilized in a heat engine/generator for the production of electricity.

12 Claims, 1 Drawing Figure

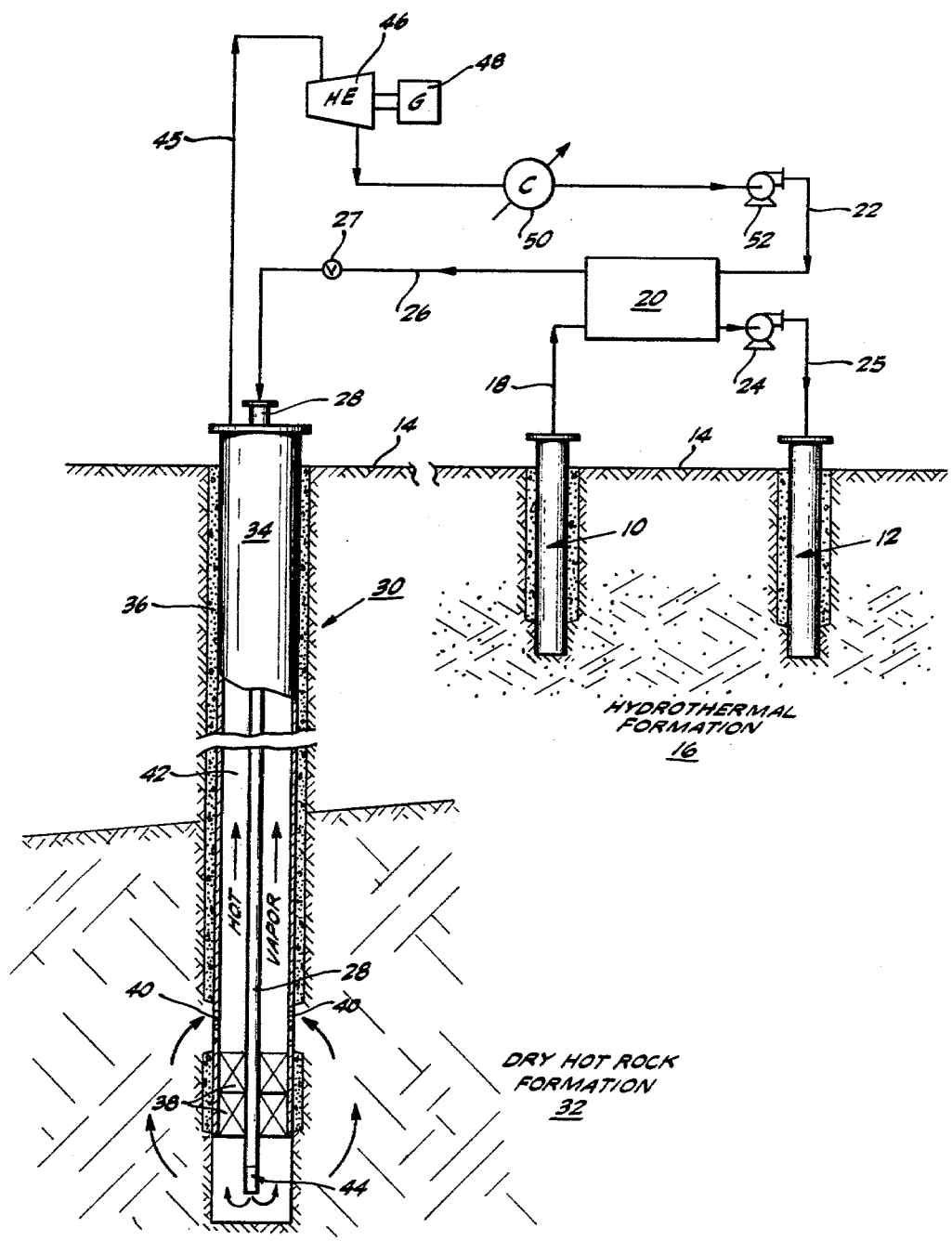

GEOTHERMAL POWER PLANT

BACKGROUND OF THE INVENTION

1. Field of the Invention

The invention relates to a method for utilizing the thermal energy contained in subterranean geothermal formations to generate electricity, and particularly to an improved method for generating electricity using thermal energy derived from hydrothermal formations and dry hot rock formations.

2. Description of the Prior Art

Sources of geothermal energy are found in many parts of the world, including both dry hot rock formations and hydrothermal formations. While a few hydrothermal formations contain dry steam, which is particularly useful in the generation of electricity, and some contain wet steam, most of the known hydrothermal formations contain geothermal brine.

Because geothermal brines are usually corrosive and contain significant amounts of dissolved salts and suspended solids, past attempts to utilize these brines in the production of electricity have experienced only limited success due to the problems of scaling, plugging and corrosion of process equipment. Many of the more easily recoverable geothermal brines have relatively moderate temperatures, such as from 100° F. to 350° F. At present, electricity has not been commercially produced using such moderate temperature brines, and these brines have had little utility other than to supply simple process heating requirements.

Research is currently being conducted to develop methods for the production of useful energy by extracting thermal energy from dry hot rock formations. Since these formations are substantially free of naturally occurring fluids, a liquid working fluid is injected through a well or system of wells penetrating the formation wherein it is heated and/or vaporized to form a hot fluid, and the hot fluid is subsequently recovered for use in the generation of electricity. A major problem anticipated in the development of the dry hot rock formations as an energy source is that, due to the low permeability and low thermal conductivity of these formations, it is difficult to obtain a sufficiently large heat exchange surface in the formation to make the operation economically feasible. Explosive and/or hydraulic fracturing methods have been proposed to increase the surface area available for heat exchange, but the limited heat exchange surface obtainable is still believed to be a major impediment to the practical development of dry hot rock formations. Another problem is that the liquid working fluid often dissolves minerals from the dry hot rock formation and, if the working fluid is allowed to later flash to a vapor in the formation or in the production well, these dissolved minerals will be precipitated therein to reduce the formation permeability and/or the productivity of the well.

Thus, a need exists for a practical and economically viable method for extracting thermal energy from subterranean geothermal formations, especially from moderate temperature hydrothermal formations and from dry hot rock formations.

Accordingly, a principal object of this invention is to provide a method for economically generating electricity using thermal energy recovered from geothermal energy sources which have not as yet been successfully exploited.

Another object of this invention is to provide an improved method for generating electricity using thermal energy extracted from both a hydrothermal formation and a dry hot rock formation.

Yet another object of this invention is to provide a method for generating electricity which combines the extraction of energy from a moderate temperature hydrothermal formation and a dry hot rock formation, to thereby avoid the difficulties expected to be encountered in the separate extraction of energy from these geothermal formations.

Further objects and advantages of this invention will be apparent to those skilled in the art from the following description taken in conjunction with the accompanying drawing.

SUMMARY OF THE INVENTION

Briefly, in the method of this invention a geothermal fluid is produced from a moderate temperature subterranean hydrothermal formation; a liquid working fluid is preheated by heat exchange with the geothermal fluid, thereby cooling the geothermal fluid; the cool geothermal fluid is preferably reinjected into the hydrothermal formation and the preheated working fluid is injected into a dry hot rock formation wherein it is vaporized; and the hot vapor is recovered and utilized in a heat engine to drive an electrical generator. In a preferred embodiment of the method of this invention, the geothermal fluid supplies sufficient sensible heat to preheat the liquid working fluid to a temperature within about 50° F. of its boiling point, and the flow rate and downhole pressure of the preheated working fluid are controlled to facilitate substantially instantaneous vaporization of the working fluid in the dry hot rock formation.

The invention provides the important advantage that the surface area available for heat exchange in the dry hot rock formation is utilized more efficiently, thereby producing more and higher temperature working fluid vapor for use in the heat engine/generator. Another advantage is that a power plant relying exclusively on geothermal energy is possible through the combined use of a hydrothermal formation and a dry hot rock formation.

BRIEF DESCRIPTION OF THE DRAWING

The drawing is a cross-sectional view of the earth penetrated by three wells which schematically illustrates one embodiment of the method of this invention.

DETAILED DESCRIPTION OF THE INVENTION

The method of this invention involves the extraction of thermal energy from both a subterranean hydrothermal formation and a subterranean dry hot rock formation. As used herein, the term "hydrothermal formation" is meant to define a geothermal formation which contains an aqueous geothermal fluid in quantities sufficient to provide a continuous stream of geothermal fluid for the practical extraction of its thermal energy. The formation must, of course, also have a sufficient permeability and/or have a suitable fracture matrix to allow the geothermal fluid to flow to a production well at a suitable rate. As used herein, the term "geothermal fluid" is meant to include both liquids and vapors produced from the hydrothermal formation, including steam, brine, noncondensible gases and steam flashed from the brine.

Hydrothermal formations are found at varying depths, ranging from 100 feet to 5,000 feet or deeper, and the temperature of the geothermal fluid contained therein can vary from ambient temperatures to about 700° F. or higher. Typically the temperature of the geothermal fluid in relatively shallow formations is lower than the temperature of the fluid in deep formations. Accordingly the geothermal fluids contained in the more readily accessible shallow hydrothermal formations have relatively moderate temperatures. These geothermal fluids, typically geothermal brines having temperatures between about 100° F. and about 350° F., are generally not suitable for use in conventional geothermal power plants. Conventional steam flash power plants have not, as a practical matter, been able to use geothermal brines having temperatures less than about 400° F., and the known binary power plants are believed to be best suited for the production of electricity from geothermal brines having temperatures on the order of 350° to 400° F. or higher. In contrast, geothermal fluids having temperatures on the order of 100° to 500° F. or higher are suitable for use in the method of this invention, and the method is particularly suited to the use of geothermal fluids having temperatures between about 150° F. and about 350° F., especially geothermal brines having temperatures between about 200° F. and about 350° F.

As used herein, the term "dry hot rock formation" is meant to define a geothermal formation which is substantially free of naturally occurring fluid and/or which has such a low permeability and such a minor amount of natural fracturing that extraction of the thermal energy of the formation using solely the naturally occurring fluid is impractical. Dry hot rock formations are found at various depths typically from 1,000 feet to 5,000 feet or deeper, with the temperature of the formation generally being higher at greater depths. Dry hot rock formations which are suitable for development employing the method of this invention are those having a temperature from 300° F. to 1000° F. or higher, particularly the formations having a temperature between about 400° F. and about 750° F. As will become apparent, it is also necessary, as a practical matter, that the dry hot rock formation be located reasonably close to the hydrothermal formation employed in the method of this invention. Various geothermally active areas are considered to have a definite potential for both hydrothermal and dry hot rock formations, (cf. "Hot Dry Rock Geothermal Energy: Status of Exploration and Assessment," ERDA 77-74, June, 1977), one of these areas being the Imperial Valley of California.

Referring to the drawing, production well 10 and injection well 12 extend from earth surface 14 into subterranean hydrothermal formation 16 which contains a geothermal fluid, and well 30 extends from earth surface 14 into subterranean dry hot rock formation 32. Production well 10 and injection well 12 are of a conventional design well known to those skilled in the art of recovering geothermal fluids from subterranean formations.

Casing 34 is disposed in well 30 and is supported by cement sheath 36 in the conventional manner. Casing 34 and cement sheath 36 serve to isolate the well from the formations overlying dry hot rock formation 32. Injection tubing 28 is also disposed in well 30 and is supported therein by a conventional wellhead support, not shown, and packer 38 which fluid tightly seals well annulus 42 about tubing 28. Perforations 40 are provided in casing 34 and cement sheath 36 at a point above packer 38 to provide fluid communication between dry hot rock formation 32 and well annulus 42. Various modifications can, of course, be made in the design of well 30, including the insulation of casing 34 and/or tubing 28, and the use of cement in lieu of packer 38 to seal the well annulus. In the preferred embodiment shown, downhole throttling device 44, such as an expansion valve, an orifice plate, or a remotely controllable throttle valve, is provided at the lower end of injection tubing 28 to reduce the pressure and help control the flow rate of the working fluid into formation 32. In a preferred embodiment, device 44 is an orifice plate and adjustable valve 27 is provided in conduit 26 to control the flow rate of the preheated working fluid into injection tubing 28.

In the method of this invention, a geothermal fluid is produced from hydrothermal formation 16 through production well 10, either by natural flow through well 10 or, if required, by pumping. The geothermal fluid is then conducted by conduit 18 into heat exchanger 20 wherein at least a substantial portion of the recoverable thermal energy of the geothermal fluid is used to supply the sensible heat to preheat a working fluid which is introduced through conduit 22 into heat exchanger 20. Heat exchanger 20 can be any one of a wide variety of heat exchangers known in the art. Where the working fluid has a substantially different density than and is immiscible in the geothermal fluid, direct contact heat exchangers may be used. However, under most circumstances, indirect heat exchangers are preferred. Heat exchangers which are particularly suited to the extraction of thermal energy from geothermal brines are preferred, especially the multistage flash heat exchanger disclosed in U.S. Pat. No. 3,972,193 to Sherwood and the multistage binary flash heat exchanger disclosed in patent application Ser. No. 811,680, filed June 30, 1977 by Fleck and Hennig, now issued as U.S. Pat. No. 4,132,075, the disclosures of which are herein incorporated by reference.

The cool geothermal fluid, typically cool brine and/or steam condensate, is conducted from heat exchanger 20 and then pressurized by pump 24, if required, for injection into hydrothermal formation 16 through conduit 25 and injection well 12. Alternatively, the cool geothermal fluid from heat exchanger 20 can be treated for the recovery of mineral values and/or fresh water and, if necessary, for the conversion of any noxious noncondensible gases to innocuous compounds.

The working fluid which has been preheated in heat exchanger 20 is then conducted via conduit 26 and injection tubing 28 through well 30 into direct contact with dry hot rock formation 32. The preheated fluid enters formation 32 from the bottom of well 30 and is vaporized, and the vapor is further heated as it flows upwardly through formation 32, and then through perforations 40 into the bottom of well annulus 42. The hot vapor is recovered from the top of well annulus 42. As an alternative to the single well, direct contact heat exchange with formation 32, it is contemplated that a downhole heat exchanger supported in a single well or interconnecting between a plurality of wells could be employed for indirect heat exchange with formation 32, as disclosed in U.S. Pat. Nos. 3,470,943 to Van Huisen and 3,274,769 to Reynolds. Another alternative contemplated involves the use of a plurality of wells penetrating formation 32 for the injection and production of a working fluid, as disclosed in U.S. Pat. Nos. 3,786,858 to Potter et al. and 3,817,038 to Paull et al. The injection of the working fluid into direct contact with formation 32 is preferred over indirect heat exchange methods due to the increased heat transfer surface area available by direct contact heat exchange. The use of a single well for circulation of the working fluid is preferred, as a practical matter, due to the high costs involved in drilling and completing wells in dry hot rock formations.

The hot vapor recovered from well annulus 42 is conducted by conduit 45 to the inlet of heat engine 46. The hot vapor is expanded in heat engine 46 thereby producing the mechanical energy which drives generator 48 to generate electricity. The fluid exhausted from heat engine 46 is condensed in condensor 50 and is then pressurized by pump 52 for recirculation through conduit 22 to heat exchanger 20.

Exemplary of the heat engines useful in the method of this invention are steam turbines, steam engines, gas turbines and other prime movers which when mechanically coupled to an electrical generator are capable of using a heated working fluid to generate electricity. In the most practical application of this invention, the heated vapor will be expanded in a steam turbine to provide the mechanical energy to drive an electrical generator.

Various working fluids can be employed in the method of this invention. For example, it is contemplated that a hydrocarbon, such as a $C_4$ to $C_{10}$ alkane, could be used as the working fluid, especially where it is desirable to use a direct contact heat exchanger to extract heat from the geothermal fluid produced from hydrothermal formation 16 and a downhole indirect heat exchanger is employed to extract thermal energy from dry hot rock formation 32. However, an aqueous fluid, particularly distilled water, is preferred for use as the working fluid. When water is used as the working fluid, it should be preheated by indirect heat exchange with the geothermal fluid, thereby preventing contamination of the working fluid with the dissolved salts and suspended solids contained in the brine.

The step of preheating the working fluid by heat exchange with the geothermal fluid from a hydrothermal formation is a critical feature of this invention. The low quality heat, i.e., thermal energy available at a relatively low temperature, of moderate temperature hydrothermal formations is relatively abundant and the cost of tapping the geothermal fluid is relatively low. In contrast, the practical extraction of the high quality heat of a dry hot rock formation may often be limited by the severely restricted surface area available for heat exchange and the very high cost of drilling, completing and maintaining wells in these very high temperature formations. The preheating step of the method of this invention employs the low quality heat of the hydrothermal formation to supply a substantial amount of the sensible heat required to heat the working fluid to its boiling point and uses the high quality heat of the dry hot rock formation primarily to vaporize the working fluid. Preferably the preheating step raises the working fluid to a temperature within about 50° F. of its boiling point so that the heat exchange surface in the dry hot rock formation is used substantially exclusively to supply the latent heat of vaporization for the working fluid and at most only a minor amount of the sensible heat required to heat the working fluid to its boiling point. Since heat transfer coefficients for the vaporization of fluids are substantially higher than the heat transfer coefficients for the nonvaporizing, sensible heating of the fluid condensate, more efficient use of the limited heat transfer surface area of the dry hot rock formation is achieved.

The heat exchange with the geothermal fluid should supply a substantial amount of sensible heat to preheat the liquid working fluid. Preferably, the working fluid is preheated in heat exchanger 20 to a temperature within about 50° F. of its boiling point at the pressure prevailing in injection tubing 28 at the wellhead. Good results are obtained when the working fluid is preheated to a temperature between about 5° F. and about 25° F. below its boiling point at the wellhead. The working fluid will be further heated as it flows downwardly through injection tubing 28, but the pressure of the working fluid will also increase due to the hydrostatic head of the working fluid in tubing 28, thereby preventing any substantial vaporization of the working fluid in tubing 28. If desired, suitable insulation and/or cooling devices well known in the art can be used in combination with injection tubing 28 to prohibit excessive vaporization of the working fluid in tubing 28. Good results are obtained when the preheated working fluid is maintained as a liquid until the time that it is discharged from the bottom of injection tubing 28 into dry hot rock formation 32.

In flowing out of injection tubing 28, the pressure of the working fluid is reduced and the working fluid is vaporized by extraction of thermal energy from the dry hot rock formation. Due to the high temperature and the reduced pressure at which the working fluid exits from tubing 28, the working fluid is very rapidly vaporized and very little, if any, of the working fluid exists as a liquid in formation 32. This substantially instantaneous vaporization of the working fluid precludes the dissolution of mineral deposits from formation 32 and therefore, the formation permeability and other production problems associated with precipitated salts and entrained solids are avoided.

In the preferred embodiment shown in the drawing, the heated working fluid is passed through throttling device 44 to reduce the downhole pressure of the working fluid just before it enters formation 32. The reduced pressure promotes more rapid vaporization of the working fluid. As discussed above, the flow rate of the working fluid is also preferably controlled by adjustment of valve 27 to minimize the amount of liquid working fluid which is allowed to accumulate in formation 32.

The invention is further illustrated by the following example which is illustrative of a specific mode of practicing the invention and is not intended as limiting the scope of the invention as defined by the appended claims.

EXAMPLE

In accordance with the method of this invention and substantially in accordance with the flow diagram illustrated in the drawing, electricity is generated by the extraction of thermal energy from a moderate temperature hydrothermal formation and a dry hot rock formation. A downhole pump is positioned at a depth of about 2,000 feet in a well penetrating the hydrothermal formation and delivers to the surface a geothermal brine having a temperature of about 350° F. at a pressure of about 495 p.s.i.a. The geothermal brine is contacted with a heat transfer fluid comprising n-pentane and is passed through a multistage binary flash heat exchanger substantially as described in the Example of application Ser. No. 811,680, now U.S. Pat. No. 4,132,075, except that the working fluid is distilled water instead of n-pentane. The geothermal brine in cooled to about 150° F. and then is injected through well 12 into the hydrothermal formation. The working fluid is heated from about 110° F. to about 330° F., which is about 10° F. below the boiling point of the distilled water at the wellhead pressure of about 120 p.s.i.a.

The preheated working fluid is conducted to the wellhead of well 30 and then through injection tubing 28 into the dry hot rock formation at a depth of about 8,000 feet. The working fluid arrives at the bottom of injection tubing 28 as a liquid having a temperature of about 670° F. and a pressure of about 2550 p.s.i.a. In flowing through throttling device 44, the pressure of the working fluid is reduced by about 1500 p.s.i., which results in an immediate vaporization to steam of about 25 percent of the working fluid. The remaining liquid working fluid is vaporized to steam substantially instantaneously upon entering the dry hot rock formation. The steam is superheated in flowing upwardly through formation 32 into the bottom of well annulus 42. The steam recovered from the top of well annulus 42 at a temperature of about 520° F. and a pressure of about 700 p.s.i.a. is then expanded in turbine 46 thereby driving generator 48 to generate electricity. The turbine exhaust is condensed in condensor 50 and then recycled.

While particular embodiments of the invention have been described, it will be understood, of course, that the invention is not limited thereto since many obvious modifications can be made and it is intended to include within this invention any such modifications as will fall within the scope of the appended claims.

Having now described the invention, I claim:

1. A method for generating electricity using the thermal energy contained in a subterranean hydrothermal formation and a subterranean dry hot rock formation, which comprises:
   (a) producing a hot geothermal fluid from said hydrothermal formation;
   (b) passing said hot geothermal fluid in heat exchange relationship with a liquid working fluid, thereby forming a cool geothermal liquid and supplying a substantial amount of sensible heat to preheat said working fluid;
   (c) passing the preheated working fluid through a first well into heat exchange relationship with said dry hot rock formation, thereby further heating and vaporizing said working fluid to form a hot vapor;
   (d) recovering said hot vapor; and
   (e) utilizing said hot vapor in a heat engine/generator to generate electricity.

2. The method defined in claim 1 wherein the geothermal fluid recovered from said hydrothermal formation comprises geothermal brine having a temperature between about 150° F. and about 350° F.

3. The method defined in claim 1 wherein said liquid working fluid is water, and wherein said working fluid is preheated by indirect heat exchange with said geothermal fluid and is vaporized by direct contact heat exchange with said dry hot rock formation.

4. The method defined in claim 1 further including the step of reducing the pressure of said preheated working fluid just prior to its entry into heat exchange relationship with said dry hot rock formation, thereby facilitating substantially instantaneous vaporization of said working fluid in said dry hot rock formation.

5. The method defined in claim 1 wherein said liquid working fluid is preheated in step (b) to a temperature within about 50° F. of its boiling point.

6. The method defined in claim 1 wherein said liquid working fluid is preheated in step (b) to a temperature between about 5° F. and about 25° F. less than its boiling point.

7. The method defined in claim 1 including the step of injecting said cool geothermal liquid through a second well into said hydrothermal formation.

8. A method for generating electricity using the thermal energy contained in a subterranean hydrothermal formation and a subterranean dry hot rock formation, which comprises:
   (a) producing geothermal brine having a temperature between about 150° F. and about 350° F. through a first well penetrating said hydrothermal formation;
   (b) passing said geothermal brine in heat exchange relationship with a liquid working fluid, thereby cooling said geothermal brine and supplying sufficient sensible heat to preheat said liquid working fluid to a temperature within about 50° F. of its boiling point;
   (c) injecting the cool geothermal brine through a second well into said hydrothermal formation;
   (d) passing the preheated working fluid through a third well into direct contact with said dry hot rock formation to further heat and vaporize said working fluid, thereby forming a hot vapor;
   (e) recovering said hot vapor;
   (f) passing said hot vapor through a heat engine/generator, thereby generating electricity and forming an effluent fluid;
   (g) cooling said effluent fluid to form a liquid; and
   (h) recycling at least a portion of the liquid formed in step (g) to step (b) as said liquid working fluid.

9. The method defined in claim 8 wherein said liquid working fluid is water and wherein said working fluid is preheated by indirect heat exchange with said geothermal brine.

10. The method defined in claim 8 further including the step of reducing the pressure of said preheated working fluid just prior to its entry into direct contact with said dry hot rock formation, thereby facilitating substantially instantaneous vaporization of said working fluid in said dry hot rock formation.

11. The method defined in claim 8 further including the step of controlling the flow rate of said working fluid into said dry hot rock formation to minimize the amount of liquid working fluid accumulated in said dry hot rock formation.

12. A method for generating electricity using the thermal energy contained in a subterranean hydrothermal formation and a subterranean dry hot rock formation, which comprises:
   (a) producing geothermal brine having a temperature between about 150° F. and about 350° F. through a relatively shallow first well penetrating said hydrothermal formation;
   (b) passing said geothermal brine in indirect heat exchange relationship with a liquid working fluid comprising water, thereby cooling said geothermal brine and supplying sufficient sensible heat to preheat said liquid working fluid to a temperature between about 5° F. and about 25° F. less than its boiling point;
   (c) injecting the cool geothermal brine through a second well into said hydrothermal formation;

(d) passing the preheated working fluid at a preselected flow rate through a third well into direct contact with said dry hot rock formation and reducing the pressure of said preheated working fluid just prior to its entry into said dry hot rock formation, said flow rate being selected and said pressure being reduced to facilitate substantially instantaneous vaporization of said working fluid to a hot vapor comprising steam in said dry hot rock formation, whereby more efficient use of the heat exchange surfaces in said dry hot rock formation is achieved;

(e) recovering said hot vapor;

(f) passing said hot vapor through a heat engine/generator, thereby generating electricity and forming an effluent fluid;

(g) cooling said effluent fluid to form a liquid; and (h) recycling at least a portion of the liquid formed in step (g) to step (b) as said liquid working fluid.

* * * * *